Figure 1:
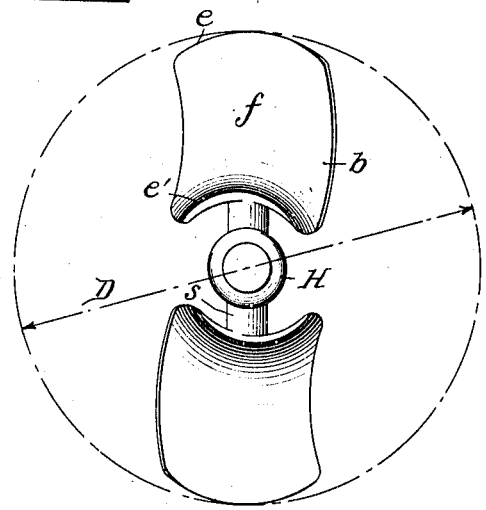

W. R. BOUTWELL.
PROPELLER.
APPLICATION FILED SEPT. 3, 1910.

1,031,415.

Patented July 2, 1912.
2 SHEETS—SHEET 1.

Witnesses

Inventor
William R. Boutwell
By
Attorney

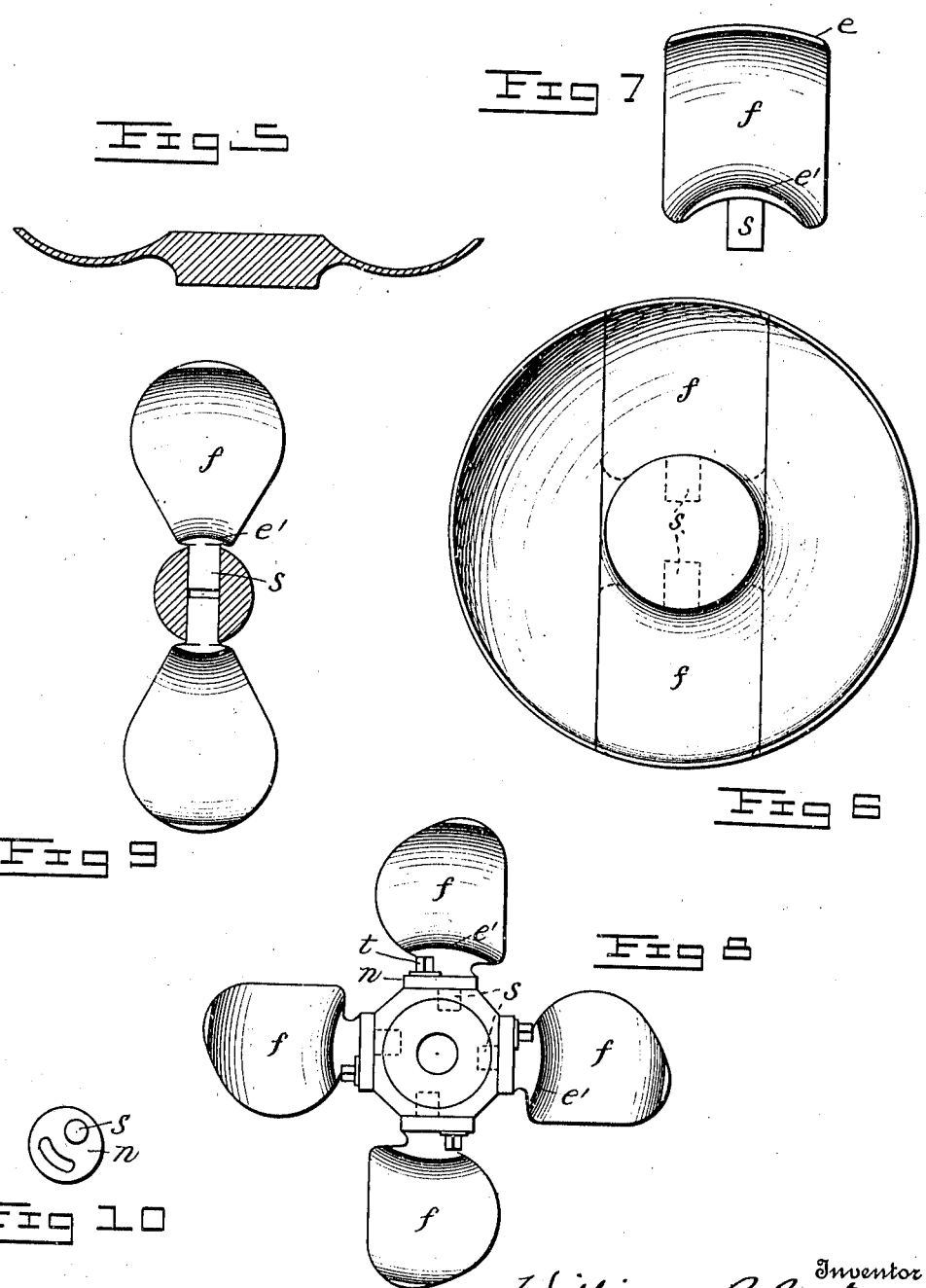

UNITED STATES PATENT OFFICE.

WILLIAM R. BOUTWELL, OF NORFOLK, VIRGINIA.

PROPELLER.

1,031,415.  Specification of Letters Patent.  Patented July 2, 1912.

Application filed September 3, 1910. Serial No. 580,379.

*To all whom it may concern:*

Be it known that I, WILLIAM R. BOUTWELL, a citizen of the United States, residing at Norfolk, in the county of Norfolk and State of Virginia, have invented new and useful Improvements in Propellers, of which the following is a specification.

My invention relates to screw propellers and has particular relation to screw propellers designed for use with water vessels. While of that particular relation and adaptation, in this disclosure, it will be evident however upon an understanding of my invention that it may be used in connection with other types of propellers in part or as a whole, and may prove of advantage when used in other situations, such for instance as in connection with blast fans, aeroplanes and airships, etc.

The object of my invention is to produce a propeller with which I can obtain under set conditions the highest possible speed for the least expenditure of power. There are a number of specially designed propellers on the market. Most of them are of complicated blade-shape and give very excellent results. I have aimed to produce a propeller simpler in design, and cheaper to manufacture, and I have succeeded in producing a simpler propeller by which under set conditions I can secure a speed fully as great, and sometimes greater than is secured by more expensive propellers of special and complicated design. I have aimed also to reduce cavitation, vibratory, frictional and centrifugal losses to a minimum consistent with the simplicity of the propeller itself, and to have the water projected by the propeller act entirely backward in as nearly a solid column as possible. With these objects attained a propeller must necessarily have the very highest efficiency.

In the accomplishment of my invention, I have devised a propeller having a grooved or dished face. Preferably I employ two or more blades, each of the blades having a groove of the same character in its driving face. The grooves are arc-shaped, and formed on a circle of the same diameter throughout, with the circle of the inner edge of the groove concentric with the circle of the outer edge of the grooves. Grooved blades which have a uniform depth of groove of the character specified, are mounted on a common hub, and the grooved faces angled more or less obliquely to the axis of rotation to form driving faces. The tops of the grooves are positioned a distance from the center of the hub equal to the radius of the circle of the top edges of the grooves.

In carrying out my invention in practice, I have devised a most advantageous method of forming the blades or the patterns for the casting of them. I take a disk or other suitable body of material, preferably somewhat flat in shape, and cut in it a circular dished groove of uniform width and depth. I then cut away the other side of the body of material from the back of the groove to reduce the body of material containing the groove to a thickness back of the groove suitable for the thickness of a propeller blade, conforming the body to the general shape of the groove. In this operation a central thickened portion may be left for the formation of stems for the blades or for the formation of a hub. The disk or other body of material is then severed transversely of the groove in parallel lines on opposite sides of its center to form blades of suitable width. Each of the blades thus formed contains a grooved face of uniform arc-shaped width and of uniform depth.

My invention will be more fully understood from a consideration of the accompanying drawings, in which:—

Figure 2:
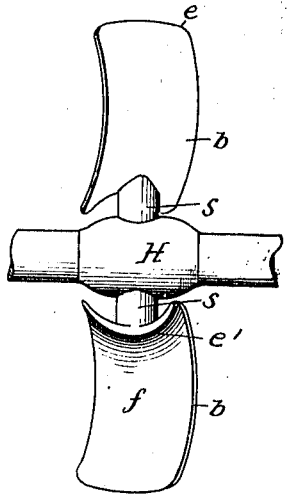
Figure 3:
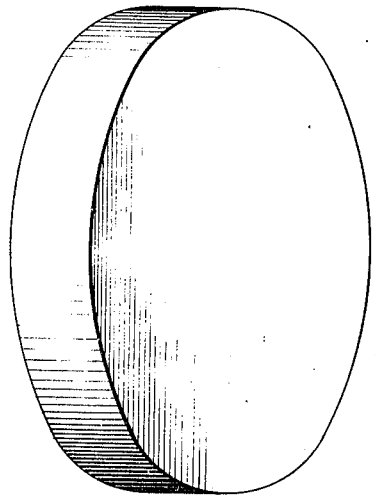
Figure 4:
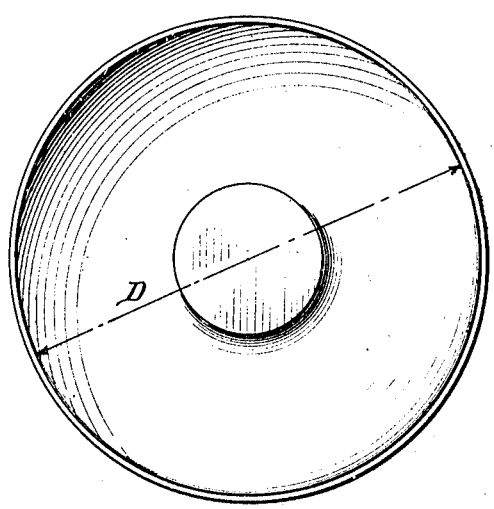

Figure 1 is a front elevation of a two-bladed propeller of my invention, Fig. 2 is a side elevation of the same, Fig. 3 is a perspective view of an uncut body of material from which one of my propellers may be made, Fig. 4 is a view of this body of material with the groove cut in one of its faces, Fig. 5 is a cross section of the same after the other side of the body has been shaped to reduce it to the right thickness and conformation, Fig. 6 is a plan of the disk so cut, showing the disk severed along lines transversely of the groove preliminary to forming blades of the severed portions as shown in dotted lines, Fig. 7 is an elevation of a blade so formed, Fig. 8 is a front elevation of a propeller having four blades and formed according to my invention, after the manner of manufacture so far employed by me, and Fig. 9 is a similar view of a two bladed propeller having blades of pear shaped contour similar to those of propellers now in common use, and is here shown in order to illustrate that the principle of my invention may be applied to propeller blades of any contour. Fig. 10 is a detail end view of the stem of the blades shown in Fig. 8.

Referring first to Figs. 1 and 2, A, B, are the blades secured to the hub H by stems *s*. These blades are dished circularly on their faces *f*, the elements of the surfaces of the faces being true arcs of circles struck from a center on a line passing through the center of the propeller. In other words, the elements of the faces *f* marked by the inner and outer edges *e* and *e'* are formed on circles which, although lying in different planes have their centers located on a line passing through the center of the hub. This is clearly shown in Fig. 6, which illustrates the manner of cutting the blades from a disk of material which has been circularly dished out, and also in Fig. 7, in both of which figures the blade is shown as being formed of a maximum diameter of dished or grooved portion, D, and of a minimum diameter of the said portion *d*. These blades, the elements of the driving faces of which are formed on concentric circles, stand in a plane perpendicular to the axis of the propeller, and are set at an angle to the axis, the angle being chosen with special reference to securing the most efficient thrust of the propeller upon the water or other medium in which it is intended to work. The result of this construction of a propeller according to my invention is that the radial movement of the medium on which the propeller acts is substantially *nil*. Each molecule or particle of the medium is engaged by the propeller as it advances, and follows in its engagement, substantially the path defined by the dotted line *p, p* on the arc of a circle concentric with the axis, the entire body of the medium acted upon, which initially is of a diameter D being projected substantially entirely backward, and with minimum projection outside of this diameter defined by the circumference corresponding to diameter D. Cavitation, vibratory and centrifugal losses are reduced to a minimum and the efficiency of this propeller is very high. Actual tests and comparison with specially designed propellers of the best now known makes have proven it equal of all, and the superior of many.

Figs. 3 to 7 inclusive, illustrate the method by which I form the propeller blades. This method is essentially adapted for forming wooden patterns for casting, although I have used it for forming propellers out of rough bodies of cast or raw material. In Fig. 3 is shown a flat disk of material such as is used. This disk is put in a lathe or other suitable machine, and its face circularly dished on true concentric arcs of circles as shown in Fig. 4. The rear of the body of material is then turned down to conform to the dished portion as shown in Fig. 5, a central thickened portion being retained for the purpose of forming a stem and a hub. The disk of the central cross section shown in Fig. 5 is then cut transversely of the dished portion or grooved portion to form blades, as shown in Fig. 6. In Fig. 6 the lines along which the disk is severed are parallel lines equidistant from the center of the disk, and the blade of Fig. 7 which is cut from the severed portions, as shown in dotted lines, is one having front and rear faces parallel. The blades of Fig. 7 I mount on a hub as shown in Fig. 1, angling the blades to obtain the most efficient driving thrust. The formation of the blades in this manner insures the formation of the elements of their dished driving faces on true concentric arcs of circles. It is the blade of this formation mounted in the manner described in connection with Figs. 1 and 2, which gives the propeller of my invention its efficiency.

In Figs. 8 and 9 I show propellers having other contours differing from the form already described principally in the fact that one of them has four blades instead of two. The blades of the propeller of Fig. 9 particularly have a contour very similar to the blades of propellers now in common use. All of these blades have driving faces, the elements of which are formed on concentric arcs of circles. The depth of the dished face or groove is, of course, uniform for each propeller. In the propeller of Fig. 8, I have provided a slightly different form of stem connecting the blades with the hub, having provided the stems with a flange portion *n* eccentric with respect to the stem *s'* and provided the eccentric portion with a slot *o* through which passes a bolt *t* for the purposes of angular adjustment (Fig. 10).

What I claim is:

1. A propeller composed of blades having annular grooves of uniform shape in cross section, which grooves are formed of circular elements having their centers located on a line passing through the axis of the propeller.

2. A propeller composed of blades having annular grooves of uniform arc-shape in cross section, which grooves are formed of circular elements having their centers located on a line passing through the axis of the propeller.

3. A propeller composed of blades having annular grooves of uniform arc-shape in cross section, which grooves are formed of circular elements having their centers located on a line passing through the axis of the propeller, the peripheral edges of said blades also forming arcs of circles having their centers on said axial line.

4. A propeller composed of blades having annular grooves of uniform shape in cross section, the inner and outer edges of which grooves are formed on concentric circles having their centers located on a line passing through the axis of the propeller.

5. The method of forming propeller blades which consists in forming a circular groove in a disk of material and thereafter cutting blades from said disk transversely of the groove.

6. The method of forming propeller blades which consists in forming a circular groove in a disk of material, at the same time leaving a central portion of the disk thicker than the grooved portion; and thereafter cutting blades from the grooved portion and stems for the blades from the thickened portion.

7. The method of forming propeller blades which consists in forming a circular groove in a disk of material, then severing the disk to form blades by cutting along parallel lines on opposite sides of the center of said disk, and thereafter dividing in two at the center the part between said parallel lines.

8. The method of forming propeller blades which consists in forming a circular depression substantially arc-shaped in cross section in a disk of material, and thereafter cutting blades from said disk transversely of the depression.

9. A propeller blade, the face of which has an annular groove of arc shape in cross section, which groove is formed of circular elements struck from a center located on a line passing through the axis of revolution of said blade, and the opposite side edges of which blade are parallel.

10. A propeller having driving surfaces, each of which has an annular groove of arc-shape in cross section, which grooved driving surfaces are formed of circular elements having their centers located on a line passing through the axis of the propeller.

11. A propeller composed of blades having annular grooves of arc-shape in cross section and of uniform radial width and uniform depth, which grooves are formed of circular elements having their centers located on a line passing through the axis of the propeller, the inner and outer edges of said arc-shaped groove lying in a plane perpendicular to the axis of the propeller.

In testimony whereof I have hereunto set my hand in presence of two subscribing witnesses.

WILLIAM R. BOUTWELL.

Witnesses:
R. C. HENLEY,
HOWARD LLOYD.